Aug. 23, 1932.  W. A. ABEGG  1,873,245
METHOD OF MAKING A CONNECTION
Filed June 1, 1929
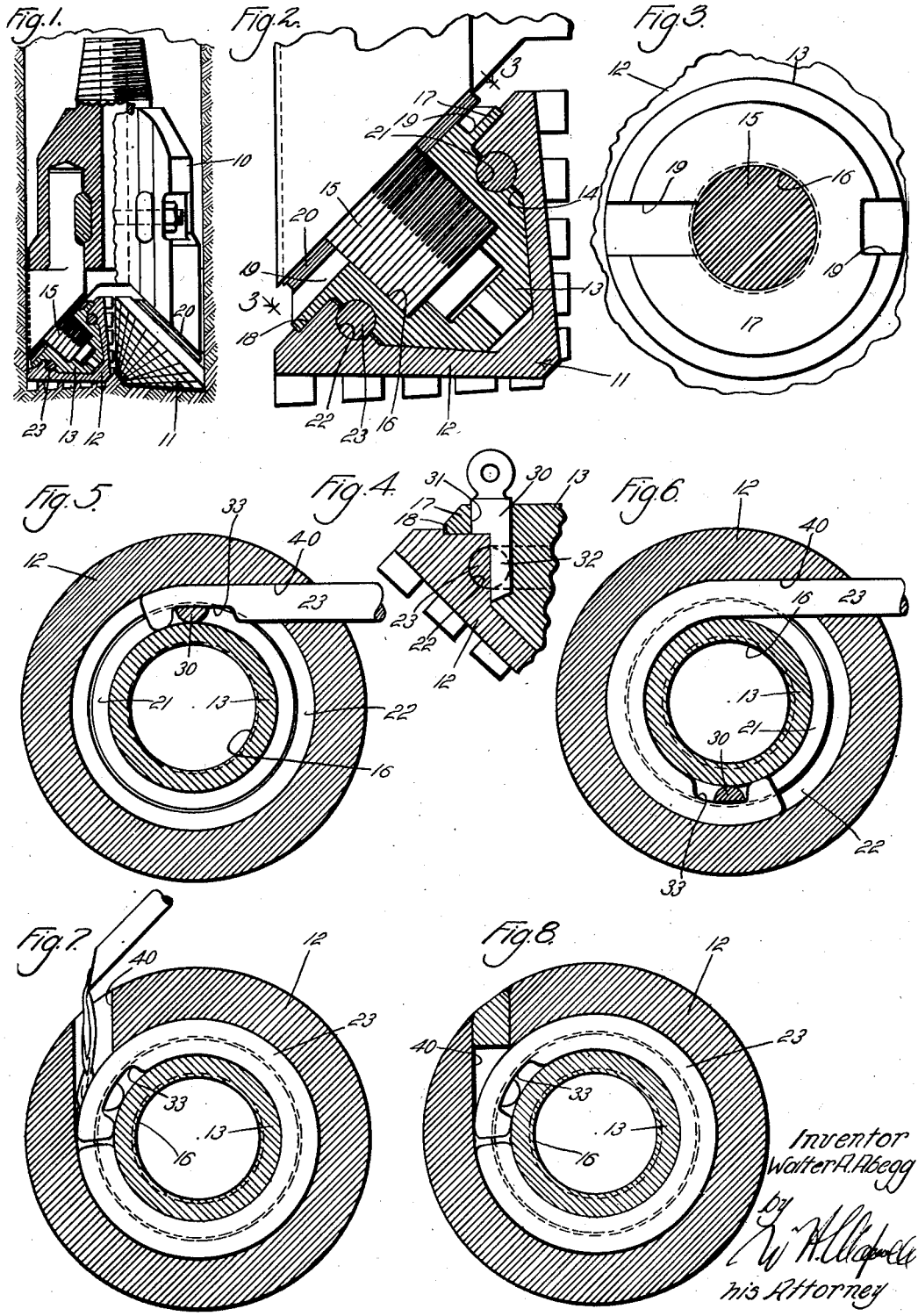
Inventor
Walter A. Abegg
by
his Attorney Patented Aug. 23, 1932

1,873,245

UNITED STATES PATENT OFFICE

WALTER A. ABEGG, OF LOS ANGELES, CALIFORNIA, ASSIGNOR, BY DIRECT AND MESNE ASSIGNMENTS, TO WIEMAN KAMMERER WRIGHT CO., INCORPORATED, OF HOLLYDALE, CALIFORNIA, A CORPORATION OF CALIFORNIA

METHOD OF MAKING A CONNECTION

Application filed June 1, 1929. Serial No. 367,820.

This invention relates to a method of making a joint or connection, it being an object of the invention to provide a commercially practical method for making a simple, secure and durable connection or joint.

The invention may be used to make a connection between parts for use in numerous situations, it being particularly useful and practical for making joints in parts of well drilling tools and the like. I will describe the invention as applied to a drilling bit, it being understood that such reference is made merely for purpose of example and without limiting the invention.

An object of the invention is to provide a method of making a joint for securely and permanently connecting two parts without the use of screw threads or other means subject to failure or becoming released.

Another object is to provide a method of making a connection between two parts involving a single member which is strong and durable and also simple and inexpensive.

A further object is to provide a method whereby a connection of the character mentioned can be made quickly and cheaply.

The various objects and features of my invention will be best and more fully understood from the following detailed description of a typical application of the invention, throughout which description I refer to the accompanying drawing, in which:

Fig. 1 is a side elevation of a well drilling bit having certain parts broken away to show in section. Fig. 2 is an enlarged detailed sectional view showing the mounting of one of the cutters of the bit. Fig. 3 is a view taken on line 3—3 on Fig. 2. Fig. 4 is a detailed sectional view similar to a portion of Fig. 2 showing the assembling pin in operating position. Fig. 5 is a transverse sectional view of the cutter unit showing the locking key about to be arranged in operating position. Fig. 6 is a view similar to Fig. 5 showing the locking key in the course of being arranged in operating position. Fig. 7 is a view similar to Figs. 5 and 6 illustrating the locking key in position and a tempering medium being applied to it, and Fig. 8 is a view similar to Figs. 5, 6 and 7 showing the construction complete and ready for operation.

In the drawing I disclose a drilling bit including a shank 10 and cutter units 11 on the shank. Each cutter unit includes a cutter 12 and a mounting bushing 13. The cutter 12 in the case illustrated is a conical member having an opening 14 extending into it from its base to receive the bushing 13. The bushing 13 is adapted to be applied to a projection or stud 15 on the shank 10, for instance, it may be provided with a threaded opening 16 to receive the stud. The bushing 13 has a radial flange 17 at the base of the cutter 12. The flange 17 preferably seats in a recess 18 provided in the base of the cutter 12 and projects from the cutter. Notches or openings 19 may be provided in the projecting portion of the flange to receive a suitable tool for applying the bushing 13 to the stud 15. In the preferred arrangement there are two openings 19 located diametrically opposite each other. I have found that forming openings 19 continuously across the flange causes the flange to warp with heat treatment, therefore I prefer to form the openings in a manner such as I have illustrated in the drawing. When the bushing 13 is applied to the stud 15, a washer 20 is arranged between the flange 17 and the part of the shank against which the bushing bears.

The invention provides registering grooves 21 and 22 in the bushing 13 and cutter 12, respectively, and a locking member or key 23 in the grooves. In the form illustrated, each groove extends completely around the member in which it is formed and is semi-circular in cross section forming a key-receiving opening round in cross section. The key 23, when in operating position, as shown in Figs. 7 and 8, extends practically the entire distance around the bushing and seats in the groove 21 in the bushing and projects into the groove 22 in the cutter 12. The key 23 is shrunk or made tight on the bushing so that it acts as a rib or projection on the bushing 13, and therefore, the key 23 preferably fits the groove 22 in the cutter 12 to allow for the desired rotation, it being understood that the other parts of the bushing 13 are suitably fitted in the opening 14 provided in the cutter 12.

In accordance with the method provided by this invention, the key 23 formed of suitable material is arranged in place between the parts hot and is then cooled or chilled, causing it to shrink onto the bushing and to have wearing qualities desirable in a construction of the kind under consideration. The key is heated until it is malleable enough to properly work or wrap into the groove 21. To apply the key 23 to the parts, one end is introduced into the opening formed by the grooves 21 and 22 through a tangential opening 40 formed in the cutter 12 and an assembling pin 30 engages the end of the key thus introduced into the opening formed by the grooves 21 and 22, and then the bushing 13 and cutter 12, are rotated relative to each other so that the key is drawn into place between them, as will be understood from the drawing. The tangential opening 40 freely passes the key 23 and is formed so that it is tangent to the opening formed by the grooves 21 and 22. In accordance with the invention, the assembling pin 30 is carried by one of the parts, for instance, an opening 31 may be formed in the bushing 13 from the flange end to intersect the groove 21. In such case the locking pin 30 is arranged in place from the flange end of the bushing 13 and has a key engaging part 32 extending across the groove 21 to engage a notch 33 provided in the end portion of the key 23. The locking pin 30 is preferably removed when the key 23 has been arranged in place so that the finished construction is entirely free of small or delicate parts. Further, by removing the assembling pin the key 23 may turn in the groove 21 without in any way impairing the construction.

It is to be understood that the key 23 is ordinarily shrunk tightly on the bushing 13 and away from cutter 12 so that it does not turn in the groove 21. When the key 23 is in place and while it is still hot, a cooling medium, say, oil, is applied to the key through the opening 40 in a manner such as I have illustrated in Fig. 7, and the bushing 13 and cutter 12, are rotated relative to each other so that the entire length of the key is exposed to the stream of oil. The oil or tempering medium cools the key, causing it to shrink onto the bushing 13 and away from the cutter and gives it a temper that is highly desirable in a construction of the character described. When the key 23 has been cooled, the opening 31 in the bushing 13 and the opening 40 in the cutter 12 may be plugged, whereupon the construction is ready for use.

The cutter unit that I have described is not only simple and inexpensive of manufacture, but is particularly effective and dependable in operation and convenient to use. The unit can be easily applied to a stud 15 by the aid of a tool engaged in the openings 19. When the bushing 13 has been made tight on the stud 15, the cutter 12 is securely and effectively mounted and is perfectly aligned so that it will rotate freely and without danger of becoming lost or displaced from the shank 10. It will be obvious that the joint or connection provided by the invention is free of delicate or complicated parts subject to failure or becoming loose or inoperative. The key 23 is of simple, sturdy construction and cannot become displaced or fail to hold the cutter 12 on the bushing 13. With the key 23 shrunk on the bushing, wear takes place between the key and the cutter, however, should the key move relative to the bushing, the construction is in no way impaired.

Having described only a typical, preferred form of my invention, I do not wish to limit myself to the specific details set forth, but wish to reserve to myself any changes or variations that may appear to those skilled in the art or fall within the scope of the following claims.

Having described my invention, I claim:

1. The method of connecting two parts one fitting around the other and having a space between them including introducing a bar of heated metal into the space through an opening in the outer part, passing a pin through an opening in the inner part to engage and temporarily connect the entering end of the bar with the inner part, rotating one of the parts relative to the other to cause the bar to be drawn into the space, and then removing the pin to release the temporary connection.

2. The method of connecting two parts one fitting around the other and having a space between them including, temporarily attaching one end of a bar to one part, turning the parts relative to each other to work the bar into the space, and then releasing the temporary attachment.

3. The method of connecting two parts one fitting around the other and having a space between them including, temporarily attaching one end of a bar to one part and then moving the parts relative to each other to work the bar into the space and then releasing the temporary attachment.

4. The method of connecting two parts one fitting around the other and having a space between them including, temporarily attaching one end of a heated bar to one part, moving the parts relative to each other to work the bar into the space, chilling the bar, and releasing the temporary attachment.

5. The method of connecting two parts, one fitting around the other and having a space between them including temporarily attaching one end of a heated metal bar to one of the parts, turning the parts relative to one another to work the bar into the space, chilling the bar, and then releasing the temporary attachment.

6. The method of connecting two parts, one fitting around the other and having an annular space between them, including introducing a bar of heated metal into the space through an opening in the outer part, passing a pin through an opening in the inner part to engage and temporarily attach the entering end of the bar to the inner part, turning the parts relative to one another to cause the bar to be drawn into the space, introducing a cooling medium to the space to chill the bar, and then removing the pin to release the temporary attachment.

7. The method of connecting two parts, one fitting around the other and having a space between them, including introducing a heater bar into the space, passing a member into an opening in one of the parts to engage the entering end of the bar and temporarily attach it to the said part, turning one of the parts relative to the other to cause the bar to be drawn into the space, applying a cooling medium to the bar to shrink it, and then removing the member to release the temporary attachment.

In witness that I claim the foregoing I have hereunto subscribed my name this 14th day of May, 1929.

WALTER A. ABEGG.